Patented July 15, 1952

2,603,610

UNITED STATES PATENT OFFICE 2,603,610

PREPARATION OF A DEHYDROGENATION CATALYST

James Lawrence Amos and Lloyd H. Silvernail, Midland, and Frederick J. Soderquist, Essexville, Mich., assignors to The Dow Chemical Company, Midland, Mich., a corporation of Delaware No Drawing. Application June 11, 1949, Serial No. 98,636

4 Claims. (Cl. 252—470)

This invention relates to an improvement in dehydrogenation and cracking catalysts produced initially in pellet form, and is concerned particularly with such catalysts as are suitable for the dehydrogenation of ethylbenzene to produce monomeric styrene.

Dehydrogenation catalysts are commonly made from one or a mixture of the oxides, especially the "difficultly reducible" oxides, or oxygen-containing salts of such diverse metals as aluminum, chromium, iron, nickel, cobalt, cerium, vanadium, niobium (columbium), tantalum, titanium, and the like, often in admixture with an oxide or oxygen-containing salt of lithium or potassium. The tungstates, molybdates, silicates, carbonates, and similar salts have been employed in preparing many dehydrogenation catalysts. The literature is replete with suggestions to use specific mixtures as catalysts in specific dehydrogenation reactions. The active oxides are commonly bound together in a porous mass by a cement which is often the agent which provides, also, the aluminum or other oxide constituents of the catalyst. Catalysts for thermal cracking often have similar compositions. It is common practice to dissolve inorganic salts, which yield oxides when heated, in water and to stir the cement or other binder and insoluble oxides into such solution until a uniform thick paste is obtained. The paste is often extruded as a continuous ribbon or rod, and the latter is cut in suitable short pieces. The resulting particles are still moist, and are dried, suitably at 80°–150° C., to remove excess water and to complete the setting of the cementitious binder. When required for use in a dehydrogenation reaction, the "pellets" are heated to the intended reaction temperature, preferably in a stream of steam and in an atmosphere of the vapors or gas to be dehydrogenated. It is common experience that such pellets have inadequate strength and hardness after being dried at the suggested 80°–150° C., and that they are crumbled easily by attrition. It has been noted as well that, when heated to reaction temperature, they become still weaker, they are not as permeable to the reagent vapors as might be desired, and a means is sought to improve both the strength and the porosity of such pellets. While produced and hardened initially as pellets, it is understood that the catalysts here concerned may be broken or ground to sizes used in fluid beds or moving beds and that they need not be maintained in the lump form common to fixed bed operation.

It has been theorized that the addition of larger amounts of water to the mixture of catalyst and binder might lead to a more permeable article, but experience has shown this to be futile, since the prime result of increasing the water content of the plastic extrusion mix is its transition from plastic gel with a definite yield strength to a fluid with no yield strength. Even if such fluid can be extruded, the product is not a coherent ribbon or rod but spreads like a fluid upon emergence from the orifice and merges with other such streams. Only non-coherent powdered catalyst mixtures can be obtained by drying such a product. In those cases in which the catalyst is activated in a stream of steam at the intended reaction temperature, or in which the reagent vapors are heated and passed together with steam through the catalyst bed, graphite and carbon black have been put into the wet extrusion mix to provide additional porosity in the final pellets due to the voids left when the carbon is destroyed by the water-gas reaction during preheating of the catalyst. Such pellets are found to be quite weak.

It is an object of the present invention to provide an improvement in pelleted catalysts for cracking and dehydrogenation reactions, and especially for the dehydrogenation of ethylbenzene to styrene, whereby the yield strength and coherence of the extruded wet mix is improved, the dry strength of the pellets is increased, and the efficiency of the catalyst is improved. A particular object is to provide an improvement as aforesaid in the type of catalyst useful in converting ethylbenzene to styrene, whereby the temperature of dehydrogenation may be lowered and the conversion of ethylbenzene to styrene in a single pass through the catalyst bed may be increased. Related objects may appear hereinafter.

We have found that the amount of water which can be tolerated in one of the above-suggested catalyst extrusion mixes may be increased materially, and that the extrusion characteristics of the mix may nevertheless be improved, by blending from 3 to 15 per cent (preferably 7 to 15 per cent) of methyl cellulose therewith, provided that the methyl cellulose is one whose 2 per cent solution in water at 20° C. has a viscosity of from 300 to 7500 centipoises, and preferably from 2000 to 3000 centipoises. We have found, further, that graphite or carbon black may be omitted from such a mix, if desired, but that, even when they are included, the strength of the oven-dried pellets is greater when the methyl cellulose is present than without it. The wet extruded product containing methyl cellulose does not form "haircracks," either before or after baking, such as have been common heretofore. A more surprising result is obtained, however, when the baked pellets containing methyl cellulose are heated to the intended reaction temperature in a stream of the vapors to be dehydrogenated. The resulting catalyst, even after prolonged operation, is harder than an otherwise identical pellet without methyl cellulose. At reaction temperature, another and entirely unexpected result is obtained. The pellet is more porous and more permeable to the reagent vapors than one made without methyl cellulose, and it is found that a higher conversion to dehydrogenated product is obtained, and at a significantly lower temperature, than when the same catalyst made without methyl cellulose is used. When it is considered that the methyl cellulose is no longer present in the catalyst pellets at dehydrogenation temperatures, since it has been destroyed by exposure to such heat, the increased effectiveness of the catalyst is difficult to explain, and we do not advance any specific theory in explanation thereof.

The invention will be illustrated by means of the following examples showing the preparation and properties of catalysts used in the conversion of ethylbenzene to styrene by dehydrogenation.

In each case, 100 parts of the designated solids and the stated number of parts of water were used in making the extrusion mix. The soluble salts (usually carbonate and dichromate) were dissolved in the water and the remaining solids were thoroughly mixed with the solution to form a smooth paste, which was extruded as rods $\frac{3}{16}$ inch in diameter and cut to $\frac{3}{8}$ inch lengths. The wet pellets were dried at 125° C. and their crushing strength was measured between two smooth plates. The constituent designated as "cement" was a commercial slow-setting corrosion resistant refractory cement having the following proximate analysis:

| | Per cent |
|---|---|
| $SiO_2$ | 9.5 |
| FeO | 6.6 |
| $Fe_2O_3$ | 4.1 |
| $Al_2O_3$ (Includes trace $TiO_2$) | 40.2 |
| CaO | 37.4 |
| MgO | 1.0 |
| S | 0.3 |
| $SO_3$ | 0.32 |
| Insoluble residue | 0.5 |

The methyl cellulose used in the mixtures reported below was one whose 2 per cent solution in water at 20° C. had a viscosity of 400 centipoises. The dried pellets were used to fill a reactor tube through which ethylbenzene vapor could be passed and in which the temperature could be controlled at the minimum value at which dehydrogenation to styrene was found to occur. Ethylbenzene was mixed with steam and passed over the pellets at an initial temperature of 650° C., which temperature was gradually lowered to the reported operating temperature, the latter being chosen to give a standard 40 per cent conversion to styrene per pass. The amount of by-products (chiefly benzene and toluene) formed, and the yield of styrene, based on the conversion, were determined. The data reported below are those for the fifth day of operation with each catalyst. Experience has shown that the catalysts of this type (without methyl cellulose) are capable of operating for as long as two years.

| Catalyst Constituents | Proportions Used | | | |
|---|---|---|---|---|
| | Control | A | B | C |
| Methyl cellulose | 0.0 | 5.0 | 10.0 | 15.0 |
| Potassium carbonate | 2.8 | 2.9 | 2.9 | 2.9 |
| Potassium dichromate | 10.8 | 10.4 | 10.4 | 10.4 |
| Cement | 11.4 | 11.3 | 11.2 | 11.2 |
| Graphite | 22.0 | 19.9 | 15.0 | 10.0 |
| Ferric oxide | 53.0 | 50.5 | 50.5 | 50.5 |
| Water | 16.2 | 33.3 | 25.9 | 26.8 |
| Results: | | | | |
| Crushing strength, baked pellets, lbs | 27 | (¹) | 32 | 23 |
| By-product, per cent | 2.4 | 3.7 | 2.3 | 2.5 |
| Conversion to styrene, per cent | 40.2 | 40.4 | 41.6 | 41.8 |
| Yield of styrene, per cent | 89.8 | 87.4 | 89.5 | 89.3 |
| Minimum operating temperature, for 40 percent conversion, °C | 630 | 610 | 610 | 615 |

¹ Not measured.

It is observed that the pellets containing methyl cellulose even with their initial higher water content, had strengths comparable to that of the blank, and that smaller amounts of graphite were employed in extruding the methyl cellulose mixtures. This was accomplished without developing hair cracks in the extruded product. The operating temperature, for comparable or slightly higher conversion rates to styrene, was 15 to 20 centigrade degrees lower when using the new mixture than when using the standard catalyst.

When the type of methyl cellulose was changed to a grade whose 2 per cent solution in water at room temperature had a viscosity in the range from 2000 to 3000 centipoises, the catalyst pellets were stronger when baked, having crushing strengths of the order of 40 to 50 pounds, and, after being calcined and used at 610° to 620° C. for a week had strengths of 13 to 15 pounds, when the amount of methyl cellulose was in the range from 5 to 15 per cent. In contrast, the pellets produced using low viscosity methyl cellulose had crushing strengths of the order of 4 to 5 pounds after a week at 610° to 620° in the dehydrogenation zone. It has been found desirable, to avoid formation of excess powder by attrition, for the catalyst pellets to have crushing strengths, after a week's use, of at least 7.5 pounds.

In another series of tests, the catalyst containing methyl cellulose was compared with an unmodified control catalyst to determine the per cent conversion of ethylbenzene to styrene at identical operating temperatures of 610° C. The data are tabulated below, and show the advantage of the pellets made using methyl cellulose.

| Constituents | Control | D |
|---|---|---|
| Methyl cellulose (2600 centipoises) | 0.0 | 10.0 |
| Potassium carbonate | 2.8 | 2.9 |
| Potassium dichromate | 10.8 | 10.4 |
| Cement | 11.4 | 11.2 |
| Graphite | 22.0 | 15.0 |
| Ferric oxide (red) | 53.0 | 50.5 |
| Water | 16.2 | 25.9 |
| Results: | | |
| By-product, per cent | 2.9 | 2.3 |
| Conversion to styrene, per cent | 35.3 | 41.6 |
| Yield of styrene, per cent | 87.4 | 89.5 |
| Operating temperature, °C | 610 | 610 |

In a similar manner, and with like advantage, pellets are extruded and cut from a dehydrogenation catalyst composition such as was used at the Schkopau plant of I. G. Farbenindustrie, modified to contain 6 per cent of methyl cellulose of the type whose 2 per cent solution in water at 20° C. has a viscosity of 4700 centipoises. The mixture consists of the following materials:

| | Parts by weight |
|---|---|
| Zinc oxide | 80 |
| Aluminum oxide | 10 |
| Calcium oxide | 5–7 |
| Potassium hydroxide | 2–3 |
| Chromic oxide | 0.5–0.7 |
| Refractory cement binder | 5–15 |
| Methyl cellulose | 6 |
| Water | 20–30 |

This mixture extrudes well to give pellets which are strong both after baking and after use, and the operating temperature for a given conversion rate is several degrees lower than when the initial extrusion mix contained no methyl cellulose. It has been found that far better results are obtained when the methyl cellulose is blended with the dry catalyst constituents while it is in the form of a dry powder rather than in solution or as a wet paste or gel. The extrusion proceeds more smoothly and the pellets have greater strength when powdered methyl cellulose is blended with the other dry constituents than when the methyl cellulose is introduced in other forms.

The invention is not limited to the use of methyl cellulose in the particular types of catalyst identified in the examples, but finds usefulness generally in pelleted or briquetted cracking and dehydrogenation catalysts of the many types known and used in the art, including catalysts for the dehydrogenation of paraffin hydrocarbons, cycloparaffins, heterocyclic compounds, alcohols, polynuclear hydro-aromatic hydrocarbons, and the like. In those cases in which the effective reaction temperature is lower than a temperature at which the methyl cellulose decomposes or is lower than a temperature at which oxygen-containing salts decompose to the catalytic oxides, the catalyst pellets or briquettes should first be heated to such decomposition temperature, preferably in a stream of steam, to activate the catalyst and to harden the pellet while making it more permeable to the reagent vapors. Thereafter, the herein-described advantages accrue to the catalyst in or just below its normal reaction temperature range. Such heated or calcined catalyst may be referred to as being in the activated condition.

We claim:

1. The method of preparing a dehydrogenation catalyst which comprises mixing the normal catalyst yielding substances for the intended reaction with from 3 to 15 per cent of their weight of a powdered methyl cellulose whose 2 per cent solution in water at room temperature has a viscosity from 2000 to 3000 centipoises, and with enough cementitious binder and water to make a thick paste, forming the paste into pellets, dehydrating the pellets, and heating the dehydrated pellets at least to the normal temperature for the intended reaction to decompose the methyl cellulose and to activate the catalyst.

2. The method of preparing a dehydrogenation catalyst which comprises mixing the normal catalyst yielding substances for the intended reaction with from 7 to 15 per cent of their weight of a methyl cellulose whose 2 per cent solution in water at room temperature has a viscosity from 2000 to 3000 centipoises, and with enough cementitious binder and water to make a thick paste, forming the paste into pellets, dehydrating the pellets, and heating the dehydrated pellets at least to the normal dehydrogenation temperature for the intended reaction to decompose the methyl cellulose and to activate the catalyst.

3. The method of preparing a dehydrogenation catalyst which comprises mixing potassium carbonate, potassium dichromate and ferric oxide with from 3 to 15 per cent of their weight of a powdered methyl cellulose whose 2 per cent solution in water at room temperature has a viscosity from 2000 to 3000 centipoises, and with enough refractory cement and water to make a thick extrudable paste, extruding the paste as rods and cutting the rods to form pellets, dehydrating the pellets, and heating the dehydrated pellets in steam at from 600° to 650° C. to decompose the methyl cellulose and to activate the catalyst.

4. The method of preparing a dehydrogenation catalyst which comprises mixing potassium carbonate, potassium dichromate and ferric oxide with from 7 to 15 per cent of their weight of a methyl cellulose whose 2 per cent solution in water at room temperature has a viscosity between 2000 to 3000 centipoises, and with enough cementitious binder and water to make a thick extrudable paste, extruding the paste as rods and cutting the rods to form pellets, dehydrating the pellets, and heating the dehydrated pellets in steam at from 600° to 650° C. in the presence of ethylbenzene vapors, to decompose the methyl cellulose and to activate the catalyst.

JAMES LAWRENCE AMOS.
LLOYD H. SILVERNAIL.
FREDERICK J. SODERQUIST.

REFERENCES CITED

The following references are of record in the file of this patent:

UNITED STATES PATENTS

| Number | Name | Date |
|---|---|---|
| 2,080,359 | Lepsoe et al. | May 11, 1937 |
| 2,408,215 | Keating | Sept. 24, 1946 |
| 2,414,585 | Eggertsen et al. | Jan. 21, 1947 |

OTHER REFERENCES

"The New Methocel, Powdered Dow Methylcellulose," pub. Dow Chem. Co., Midland, Mich., March 1, 1949.